United States Patent
Murphy et al.

(10) Patent No.: US 6,625,810 B1
(45) Date of Patent: Sep. 23, 2003

(54) DELIVERY OF INTERACTIVE PROGRAM GUIDE DATA

(75) Inventors: Patrick Joseph Murphy, San Diego, CA (US); David Louis Berger, San Diego, CA (US); Clive Eric Holborow, San Diego, CA (US); Elizabeth Ann Khodabakhsh, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/250,699

(22) Filed: Feb. 16, 1999

(51) Int. Cl.[7] .............................. G06F 3/00; H04B 1/66

(52) U.S. Cl. .......................... 725/39; 725/54; 725/50; 725/131; 725/139; 370/442

(58) Field of Search ................................ 725/131, 139, 725/151, 38–62, 1; 370/321, 337, 347, 442

(56) References Cited

U.S. PATENT DOCUMENTS

| | | | | |
|---|---|---|---|---|
| 5,592,551 A | * | 1/1997 | Lett et al. ........................ | 380/20 |
| 5,666,645 A | | 9/1997 | Thomas et al. | |
| 5,801,753 A | * | 9/1998 | Eyer et al. ....................... | 348/13 |
| 5,898,695 A | * | 4/1999 | Fujii et al. ..................... | 370/464 |
| 5,918,156 A | * | 6/1999 | Tanabe ........................ | 455/12.1 |
| 5,946,326 A | * | 8/1999 | Rinne ........................... | 370/486 |
| 6,057,886 A | * | 5/2000 | Van Gestel ................. | 348/467 |
| 6,173,330 B1 | * | 1/2001 | Guo et al. .................... | 709/232 |
| 6,222,825 B1 | * | 4/2001 | Mangin et al. .............. | 370/235 |
| 6,240,103 B1 | * | 5/2001 | Schoenblum et al. ........ | 370/468 |
| 6,311,329 B1 | * | 10/2001 | Terakado et al. .............. | 725/44 |
| 6,393,489 B1 | * | 5/2002 | Sambamurthy et al. ...... | 709/250 |
| 6,401,242 B1 | * | 6/2002 | Eyer et al. ..................... | 725/35 |
| 6,415,437 B1 | * | 7/2002 | Ludvig et al. ................. | 725/41 |
| 6,518,986 B1 | * | 2/2003 | Mugura ........................ | 345/810 |

FOREIGN PATENT DOCUMENTS

| | | |
|---|---|---|
| EP | 0 758 833 A2 | 2/1997 |
| EP | 0 836 321 A2 | 4/1998 |

OTHER PUBLICATIONS

European Broadcasting Union, "Digital broadcasting systems for television, sound and data services", ETS 300 468 Oct. 1995.

* cited by examiner

*Primary Examiner*—John Miller
*Assistant Examiner*—Annan Q. Shang
(74) *Attorney, Agent, or Firm*—Edward W. Callan

(57) ABSTRACT

Interactive program guide (IPG) data is delivered to a receiver from which a program guide can be retrieved. The IPG data includes schedule-data for each of a plurality of time slots, description-data for each of the plurality of time slots, and non-time-sensitive foundation data. The IPG data is delivered by the steps of: (a) delivering a plurality of segments of foundation data having a predetermined closed-loop order; (b) delivering the schedule-data segments for a first time slot; (c) delivering the description-data segments for a first time slot; (d) delivering the schedule-data segments and the description-data segments for each of the remaining time slots; (e) subsequent to the delivery of the first schedule-data segment for each time slot, during a gap of sufficient duration to enable the receiver to allocate memory space for storing all of the schedule-data segments for the time slot, delivering the next non-time-sensitive foundation-data segments in the predetermined order for use by the receiver; and (f) subsequent to the delivery of the first description-data segment for each time slot, during a gap of sufficient duration to enable the receiver to allocate memory space for storing all of the description-data segments for the time slot, delivering the next non-time-sensitive foundation-data segments in the predetermined order for use by the receiver. Subsequent to step (f), the next given number of foundation-data segments in the predetermined order are delivered until all of the foundation-data segments have been delivered at least twice.

15 Claims, 2 Drawing Sheets

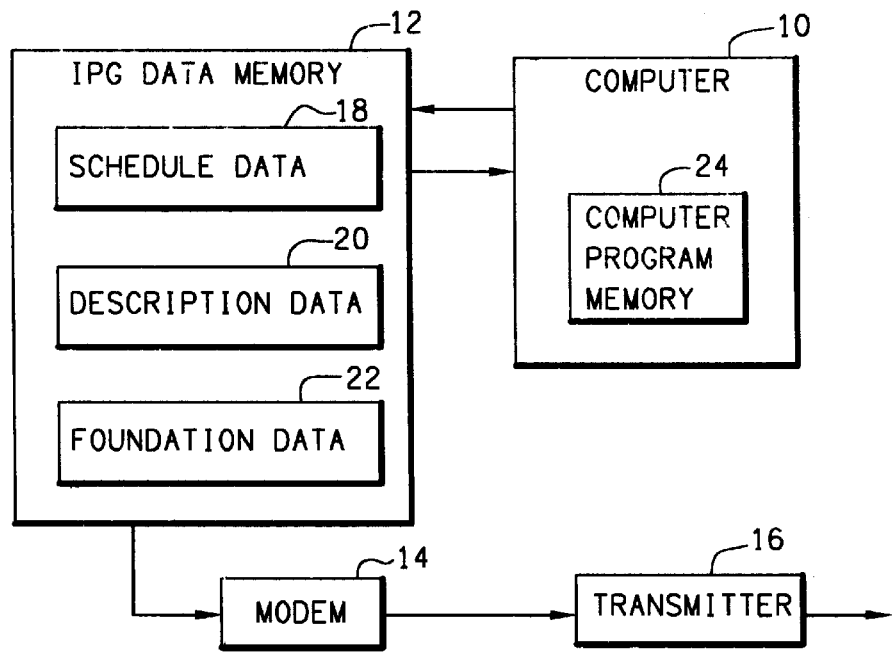
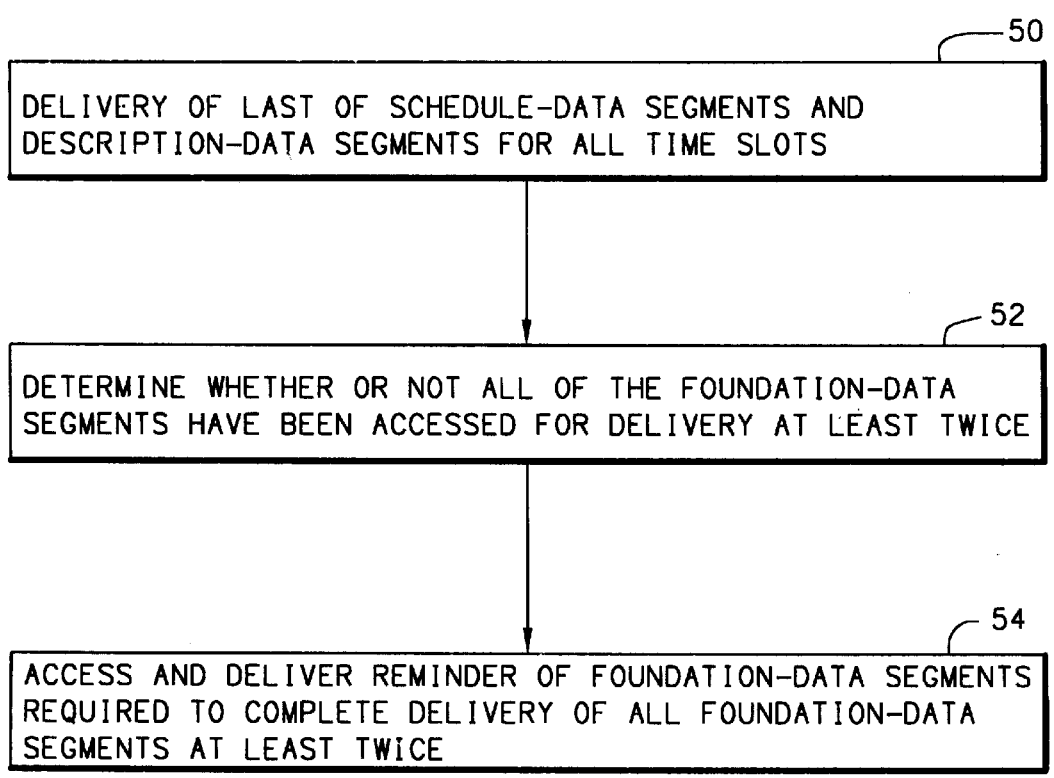
FIG. 2

| | |
|---|---|
| ALL FOUNDATION-DATA SEGMENTS | ~30 |
| FIRST SCHEDULE-DATA SEGMENT FOR FIRST TIME SLOT | ~31 |
| INITIAL FOUNDATION-DATA SEGMENTS (GAP OF SUFFICIENT DURATION TO ENABLE RECEIVER TO ALLOCATE MEMORY SPACE FOR STORING ALL OF THE SCHEDULE-DATA SEGMENTS FOR THE FIRST TIME SLOT) | ~32 |
| REMAINING SCHEDULE-DATA SEGMENTS FOR FIRST TIME SLOT | ~33 |
| FIRST DESCRIPTION-DATA SEGMENT FOR FIRST TIME SLOT | ~34 |
| NEXT FOUNDATION-DATA SEGMENTS (GAP OF SUFFICIENT DURATION TO ENABLE RECEIVER TO ALLOCATE MEMORY SPACE FOR STORING ALL OF THE DESCRIPTION-DATA SEGMENTS FOR THE FIRST TIME SLOT) | ~35 |
| REMAINING SCHEDULE-DATA SEGMENTS FOR FIRST TIME SLOT | ~36 |
| ⋮ | ⋮ |
| FIRST SCHEDULE-DATA SEGMENT FOR LAST TIME SLOT | ~41 |
| NEXT FOUNDATION-DATA SEGMENTS (GAP OF SUFFICIENT DURATION TO ENABLE RECEIVER TO ALLOCATE MEMORY SPACE FOR STORING ALL OF THE SCHEDULE-DATA SEGMENTS FOR THE FIRST TIME SLOT) | ~42 |
| REMAINING SCHEDULE-DATA SEGMENTS FOR LAST TIME SLOT | ~43 |
| FIRST DESCRIPTION-DATA SEGMENT FOR LAST TIME SLOT | ~44 |
| NEXT FOUNDATION-DATA SEGMENTS (GAP OF SUFFICIENT DURATION TO ENABLE RECEIVER TO ALLOCATE MEMORY SPACE FOR STORING ALL OF THE DESCRIPTION-DATA SEGMENTS FOR THE LAST TIME SLOT) | ~45 |
| REMAINING DESCRIPTION-DATA SEGMENTS FOR LAST TIME SLOT | ~46 |
| REMAINDER OF FOUNDATION-DATA SEGMENTS REQUIRED TO COMPLETE DELIVERY OF ALL FOUNDATION-DATA SEGMENTS AT LEAST TWICE | ~47 |

IPG DATA DELIVERY SCHEDULE

FIG. 3

DELIVERY OF INTERACTIVE PROGRAM GUIDE DATA

BACKGROUND OF THE INVENTION

The present invention generally pertains to communications delivered to programming subscribers and is particularly directed to an improvement in delivering interactive program guide (IPG) data to a receiver from which a program guide can be retrieved.

The IPG data is delivered by a programming service provider to a receiver at a subscriber location and stored in a memory within the receiver so that a program guide can be retrieved by the subscriber whenever desired. The programming includes, for example, television shows, music, and informational data pertaining to various subjects, which are broadcast over different channels via communications satellite transmission and/or cable.

The IPG data includes schedule-data for each of a plurality of channels scheduled to be broadcast within each of a plurality of time slots within a given extended period of time, description-data for all of the programming within each of the plurality of time slots, and such non-time-sensitive data as foundation data. The given extended period of a time for which IPG data is delivered encompasses an extended period of programming, such as several days, and each time slot encompasses a shorter period of programming, such as four, eight or twenty-four hours.

The schedule-data for the different time slots within the given extended period is delivered in respectively different delivery periods and the description-data for the different time slots within the given extended period is delivered in respectively different delivery periods. The schedule data delivered to the receiver memory for the first time slot indicates the start times and programming identifiers for each of the different programs that are scheduled to be available on all of the plurality of channels during the first time slot, and the schedule data delivered to the receiver memory for the second time slot for the given extended period indicates the start times and programming identifiers for each of the different programs that are scheduled to be available on the second time slot during the given extended period.

The description data provides a brief description of various attributes of the different programs, such as names of lead actors and a brief plot synopsis for a movie, as typically provided in a printed programming guide. The description data is retrieved within the receiver by referring to a tag or label therein that is also included in the schedule data for the program.

The foundation data includes data that is necessary for retrieval of the schedule data and the description data for display, such as Huffman tables that are necessary to decompress the schedule data and the description data delivered to and stored in the receiver memory, channel name tables, theme classes and slot sizes for common data blocks. The receiver includes a decoder that utilizes the foundation data to decode schedule data and description data retrieved from the receiver memory in order to display the retrieved data on a video monitor. The foundation data usually is delivered at least twice for the given extended period for which schedule data and description data is delivered for a plurality of different time slots.

The respective sizes of a block of schedule data and a block of description data for a given time slot typically are such that an entire block of either type of data cannot be broadcast as a single data burst having not more than a predetermined number of bytes, such as 1024 bytes, and thereby must be segmented for delivery to the receiver. In accordance with a method of delivering such data in segments, the first segment of the schedule data for each time slot includes a segment count indicating the number of schedule-data segments that are to be delivered for the given time slot; and the first segment of the description data for each time slot includes a segment count indicating the number of description-data segments that are to be delivered for the given time slot. The receiver allocates memory space for storing the number of segments indicated by the segment count included in the first segment of the schedule data received for the given time slot and also allocates additional memory space for storing the number of segments indicated by the segment count included in the first segment of the description data received for the given time slot. Since it takes a significant amount of time for the receiver to allocate such memory space, the second segment of schedule/description data for the given time slot will be lost if it is delivered immediately after delivery of the first segment of schedule/description data for the given time slot before allocation of the memory space for storage of all of the schedule/description-data segments has been completed.

SUMMARY OF THE INVENTION

The present invention provides a method of delivering interactive program guide (IPG) data and non-time-sensitive data to a receiver from which a program guide can be retrieved, said IPG data including one or more schedule-data segments for each of a plurality of time slots and one or more description-data segments for each of the plurality of time slots, the method comprising the steps of:

(a) delivering the schedule-data segments for a first time slot;

(b) delivering the description-data segments for the first time slot;

(c) delivering the schedule-data segments and the description-data segments for each of the remaining time slots;

(d) subsequent to the delivery of the first schedule-data segment for each time slot, during a gap of sufficient duration to enable the receiver to allocate memory space for storing all of the schedule-data segments for the time slot, delivering non-time-sensitive data for use by the receiver; and (e) subsequent to the delivery of the first description-data segment for each time slot, during a gap of sufficient duration to enable the receiver to allocate memory space for storing all of the description-data segments for the time slot, delivering non-time-sensitive data for use by the receiver. It is not necessary that the schedule data for a given time slot be delivered prior to delivery of the description data for the given time slot, whereby either one of steps (a) and step (b) can be performed before the other of these two steps.

Preferably, the non-time-sensitive data delivered during steps (d) and (e) includes further IPG data, to wit: a plurality of foundation-data segments having a predetermined closed-loop order; wherein during the gap according to step (d) that is subsequent to the delivery of the first schedule-data segment for the first time slot, the delivered non-time-sensitive data includes an initial number of foundation-data segments in the predetermined order; wherein during each of the next remaining respective gaps of steps (d) and (e), the delivered non-time-sensitive data includes the next number of foundation-data segments in the predetermined order; and wherein the respective number of foundation-data segments delivered during each gap are of sufficient duration to enable the receiver to allocate memory space for storing the respective schedule-data segments or description-data segments for the time slot.

The present invention also provides a system for accessing IPG data and non-time-sensitive data for delivery to a receiver from which a program guide can be retrieved, said IPG data including one or more schedule-data segments for each of a plurality of time slots and one or more description-data segments for each of the plurality of time slots, the system comprising: means for accessing the IPG data and the non-time-sensitive data for delivery such that the IPG data and the non-time-sensitive data can be delivered by the steps, of the above-described method of delivering IPG data and non-time-sensitive data to a receiver from which a program guide can be retrieved.

The present invention further provides a computer readable storage medium for use in a system for accessing IPG data and non-time-sensitive data for delivery to a receiver from which a program guide can be retrieved, said IPG data including one or more schedule-data segments for each of a plurality of time slots and one or more description-data segments for each of the plurality of time slots, wherein the storage medium is configured so as to cause the IPG data and the non-time-sensitive data to be accessed for delivery such that the IPG data and the non-time-sensitive data can be delivered by the steps of the above-described method of delivering IPG data and non-time-sensitive data to a receiver from which a program guide can be retrieved.

Additional features of the present invention are described with reference to the detailed description of the preferred embodiments.

BRIEF DESCRIPTION OF THE DRAWING

FIG. 1 is a block diagram of a system for delivering IPG data in accordance with a preferred embodiment of the present invention.

FIG. 2 is a block diagram of a sequence of routines performed in accordance with a preferred embodiment of the present invention.

FIG. 3 is an IPG data delivery schedule in accordance with a preferred embodiment of the present invention.

DETAILED DESCRIPTION

Referring to FIG. 1, a system for delivering IPG data in accordance with a preferred embodiment of the present invention includes a computer 10, an IPG data memory 12, a modem 14 and a transmitter 16. The transmitter 16 is located at the broadcast site of a programming service provider, such as an up-link site when the programming services are provided by communications satellite transmission.

The IPG data memory 12 stores schedule data 18 and description data 20 for each of a plurality of time slots and also stores foundation data 22.

A computer program memory 24 included in the computer includes a computer readable storage medium that is configured in accordance with a computer program stored therein so as to cause the IPG data to be accessed by the computer 10 for segmented delivery to receivers at subscriber locations via the modem 14 and the transmitter 16 such that the IPG data and the non-time-sensitive foundation data 18, 20, 22 can be delivered by the above-described method of the present invention. The foundation-data segments have a predetermined closed-loop order.

In a preferred embodiment of the method of the present invention the IPG data 18, 20, 22 is delivered in segments to the subscriber receivers in accordance with the IPG data delivery schedule shown in FIG. 3. Initially all of the foundation data segments 30 are delivered in the predetermined order. Then the first schedule-data segment 31 for a first time slot is delivered. Then the initial foundation data segments 32 are delivered in the predetermined order during a gap of sufficient duration to enable the receiver to allocate memory space for storing all of the schedule-data segments for the first time slot. Then the remaining schedule-data segments 33 for the first time slot are delivered. Then the first description-data segment 34 for first time slot is delivered. Then the next foundation data segments 35 are delivered in the predetermined order during a gap of sufficient duration to enable receiver to allocate memory space for storing all of the description-data segments for the first time slot. Then the remaining description-data segments 36 for first time slot are delivered.

The schedule-data segments and the description-data segments for each of the remaining time slots are then delivered in accordance with the same schedule as shown in FIG. 3 for the first time slot, with foundation-data segments being delivered in the predetermined order during the gaps following the first schedule/description-data segment for the respective time slot, with the gaps being of sufficient duration to enable the receiver to allocate memory space for storing all of the schedule/description-data segments for the respective time slot.

During the last portion of the schedule, the first schedule-data segment 41 for last time slot is delivered. Then the next foundation data segments 42 are delivered in the predetermined order during a gap of sufficient duration to enable the receiver to allocate memory space for storing all of the schedule-data segments for the last time slot. Then the remaining schedule-data segments 43 for the last time slot are delivered. Then the first description-data segment 44 for last time slot is delivered. Then the next foundation data segments 45 are delivered in the predetermined order during a gap of sufficient duration to enable receiver to allocate memory space for storing all of the description-data segments for the last time slot. Then the remaining description-data segments 46 for last time slot are delivered. Finally there are delivered the remainder of that foundation-data segments 47 that are required to complete delivery of all of the foundation-data segments at least twice.

The computer 10 monitors the accessing from the IPG data memory 12 of the IPG data for all of the time slots and upon delivery of last of schedule-data segments and the last of the description-data segments for all time slots 50, as shown in FIG. 2, the computer program stored in the computer program memory 24 causes the computer 10 to (52) determine whether or not all of the foundation-data segments have been accessed for delivery at least twice, and if not, causes the computer 10 to (54) access from the IPG data memory 12 and cause delivery of the remainder of foundation-data segments that are required to complete delivery of all of the foundation-data segments at least twice.

In alternative embodiments (not shown), none of the foundation data is delivered prior to delivery of the first schedule-data segment and the first description-data segment for the first time slot; and/or non-time-sensitive data other than or in addition to the foundation data is delivered during the gaps following the first schedule-data segment and the first description-data segment for the respective time slots.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A method of delivering interactive program guide (IPG) data and non-time-sensitive data to a receiver from which a program guide can be retrieved, said IPG data including one or more schedule-data segments for each of a plurality of time slots and one or more description-data segments for each of the plurality of time slots, the method comprising the steps of:
    (a) delivering the schedule-data segments for a first time slot;
    (b) delivering the description-data segments for the first time slot;
    (c) delivering the schedule-data segments and the description-data segments for each of the remaining time slots;
    (d) subsequent to the delivery of the first schedule-data segment for each time slot, during a gap of sufficient duration to enable the receiver to allocate memory space for storing all of the schedule-data segments for the time slot, delivering non-time-sensitive data for use by the receiver; and
    (e) subsequent to the delivery of the first description-data segment for each time slot, during a gap of sufficient duration to enable the receiver to allocate memory space for storing all of the description-data segments for the time slot, delivering non-time-sensitive data for use by the receiver.

2. A method according to claim 1, wherein the non-time-sensitive data delivered during steps (d) and (e) includes further IPG data, to wit: a plurality of foundation-data segments having a predetermined closed-loop order;
    wherein during the gap according to step (d) that is subsequent to the delivery of the first schedule-data segment for the first time slot, the delivered non-time-sensitive data includes an initial number of foundation-data segments in the predetermined order;
    wherein during each of the next remaining respective gaps of steps (d) and (e), the delivered non-time-sensitive data includes the next number of foundation-data segments in the predetermined order; and
    wherein the respective number of foundation-data segments delivered during each gap are of sufficient duration to enable the receiver to allocate memory space for storing the respective schedule-data segments or description-data segments for the time slot.

3. A method according to claim 2, further comprising the steps of:
    (f) subsequent to step (e), determining whether or not all of the foundation-data segments have been delivered at least twice; and
    (g) when it is determined pursuant to step (f) that all of the foundation-data segments have not been delivered at least twice, delivering the next foundation-data segments in the predetermined order until all of the foundation-data segments have been delivered at least twice.

4. A method according to claim 3, further comprising the step of:
    (h) prior to steps (a) and (b), delivering all of the foundation data segments once.

5. A method according to claim 2, further comprising the step of:
    (f) prior to steps (a) and (b), delivering all of the foundation data segments once.

6. A system for accessing interactive program guide (IPG) data and non-time-sensitive data for delivery to a receiver from which a program guide can be retrieved, said IPG data including one or more schedule-data segments for each of a plurality of time slots and one or more description-data segments for each of the plurality of time slots, the system comprising:
    means for accessing the IPG data and the non-time-sensitive data for delivery such that the IPG data and the non-time-sensitive data can be delivered by the steps of:
        (a) delivering the schedule-data segments for a first time slot;
        (b) delivering the description-data segments for the first time slot;
        (c) delivering the schedule-data segments and the description-data segments for each of the remaining time slots;
        (d) subsequent to the delivery of the first schedule-data segment for each time slot, during a gap of sufficient duration to enable the receiver to allocate memory space for storing all of the schedule-data segments for the time slot, delivering non-time-sensitive data for use by the receiver; and
        (e) subsequent to the delivery of the first description-data segment for each time slot, during a gap of sufficient duration to enable the receiver to allocate memory space for storing all of the description-data segments for the time slot, delivering non-time-sensitive data for use by the receiver.

7. A system according to claim 6, wherein the non-time-sensitive data delivered during steps (d) and (e) includes further IPG data, to wit: a plurality of foundation-data segments having a predetermined closed-loop order;
    wherein during the gap according to step (d) that is subsequent to the delivery of the first schedule-data segment for the first time slot, the delivered non-time-sensitive data includes an initial number of foundation-data segments in the predetermined order;
    wherein during each of the next remaining respective gaps of steps (d) and (e), the delivered non-time-sensitive data includes the next number of foundation-data segments in the predetermined order; and
    wherein the respective number of foundation-data segments delivered during each gap are of sufficient duration to enable the receiver to allocate memory space for storing the respective schedule-data segments or description-data segments for the time slot.

8. A system according to claim 7, further comprising:
    means for determining, subsequent to accessing all of the schedule-data segments and description-data segments for all of the time slots, whether or not all of the foundation-data segments have been accessed at least twice;
    wherein the accessing means are adapted for responding to a said determination that all of the foundation-data segments have not been accessed at least twice by accessing the next foundation-data segments in the predetermined order for said delivery until all of the foundation-data segments have been accessed at least twice for said delivery.

9. A system according to claim 8, wherein the accessing means are adapted for accessing all of the foundation data segments for delivery once prior to steps (a) and (b).

10. A system according to claim 7, wherein the accessing means are adapted for accessing all of the foundation data segments for delivery once prior to steps (a) and (b).

11. A computer readable storage medium for use in a system; for accessing interactive program guide (IPG) data and non-time-sensitive data for delivery to a receiver from which a program guide can be retrieved, said IPG data including one or more schedule-data segments for each of a plurality of time slots and one or more description-data segments for each of the plurality of time slots, wherein the storage medium is configured so as to cause the IPG data and the non-time-sensitive data to be accessed for delivery such that the IPG data and the non-time-sensitive data can be delivered by the steps of:
(a) delivering the schedule-data segments for a first time slot;
(b) delivering the description-data segments for the first time slot;
(c) delivering the schedule-data segments and the description-data segments for each of the remaining time slots;
(d) subsequent to the delivery of the first schedule-data segment for each time slot, during a gap of sufficient duration to enable the receiver to allocate memory space for storing all of the schedule-data segments for the time slot, delivering non-time-sensitive data for use by the receiver; and
(e) subsequent to the delivery of the first description-data segment for each time slot, during a gap of sufficient duration to enable the receiver to allocate memory space for storing all of the description-data segments for the time slot, delivering non-time-sensitive data for use by the receiver.

12. A storage medium according to claim 11, wherein the non-time-sensitive data delivered during steps (d) and (e) includes further IPG data, to wit: a plurality of foundation-data segments having a predetermined closed-loop order;

wherein during the gap according to step (d) that is subsequent to the delivery of the first schedule-data segment for the first time slot, the delivered non-time-sensitive data includes an initial number of foundation-data segments in the predetermined order;

wherein during each of the next remaining respective gaps of steps (d) and (e), the delivered non-time-sensitive data includes the next number of foundation-data segments in the predetermined order; and wherein the respective number of foundation-data segments delivered during each gap are of sufficient duration to enable the receiver to allocate memory space for storing the respective schedule-data segments or description-data segments for the time slot.

13. A storage medium according to claim 12, further configured for causing a computer to determine, subsequent to said accessing of all of the schedule-data segments and description-data segments for all of the time slots, whether or not all of the foundation-data segments have been accessed at least twice, and for responding to a said, determination that all of the foundation-data segments have not been accessed at least twice by causing the next foundation-data segments in the predetermined order to be accessed for said delivery until all of the foundation-data segments have been accessed at least twice for said delivery.

14. A storage medium according to claim 13, further configured for causing all of the foundation data segments to be accessed for deliver once prior to steps (a) and (b).

15. A storage medium according to claim 12, further configured for causing all of the foundation data segments to be accessed for delivery once prior to steps (a) and (b).

* * * * *